United States Patent [19]
Bertino et al.

[11] Patent Number: 5,249,368
[45] Date of Patent: Oct. 5, 1993

[54] APPARATUS AND METHOD FOR ISOLATED REMEDIATION OF CONTAMINATED SOIL

[76] Inventors: William Bertino, 5 Oakdale Dr., Millville, N.J. 08332; Frank Pace, 248 W. Wheat Rd., Vineland, N.J. 08360; Gilbert Marshall, 559 Evansburg Road, Collegeville, Pa., 19426.

[21] Appl. No.: 812,399

[22] Filed: Dec. 23, 1991

[51] Int. Cl.⁵ .............................. F26B 5/04
[52] U.S. Cl. .......................... 34/15; 34/92; 34/54
[58] Field of Search .................. 34/92, 15, 54

[56] References Cited

U.S. PATENT DOCUMENTS

| | | | |
|---|---|---|---|
| 3,444,626 | 5/1969 | Burton | 34/92 |
| 3,672,068 | 6/1972 | Wilkison | 34/92 |
| 4,575,391 | 3/1986 | De Boodt et al. | 71/28 |
| 4,660,639 | 4/1987 | Visser et al. | 166/267 |
| 4,663,085 | 5/1987 | Enda et al. | 252/626 |
| 4,730,672 | 3/1988 | Payne | 166/266 |
| 4,765,902 | 8/1988 | Ely et al. | 210/610 |
| 4,774,002 | 9/1988 | Gutman et al. | 210/636 |
| 4,774,009 | 9/1988 | Gordon | 210/766 |
| 4,801,384 | 1/1989 | Steiner | 210/634 |
| 4,842,448 | 6/1989 | Koerner et al. | 405/258 |
| 4,849,360 | 7/1989 | Norris et al. | 435/264 |
| 4,919,570 | 4/1990 | Payne | 405/128 |

Primary Examiner—Henry A. Bennet
Assistant Examiner—Denise L. Gromada
Attorney, Agent, or Firm—Thomas A. Lennox

[57] ABSTRACT

An apparatus and method is provided using a standard sized and shaped roll-off trash container sealed to contain contaminated soils to be treated with a central lengthwise vacuum tube to draw off vapors through a blower with air intake tubing aligned along the lengthwise side walls to distribute air to the soil mass with valve controls on the intake openings with the container having an openable side to dump the cleansed soil after treatment.

14 Claims, 3 Drawing Sheets

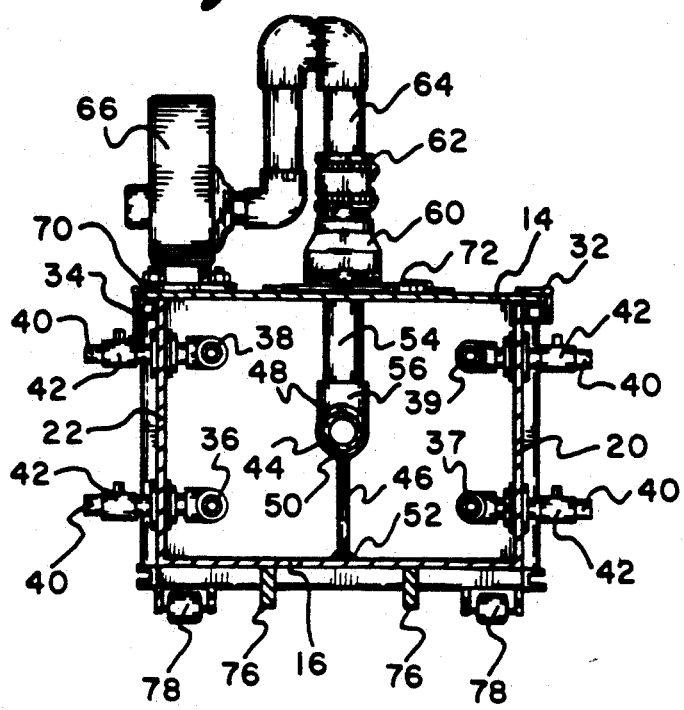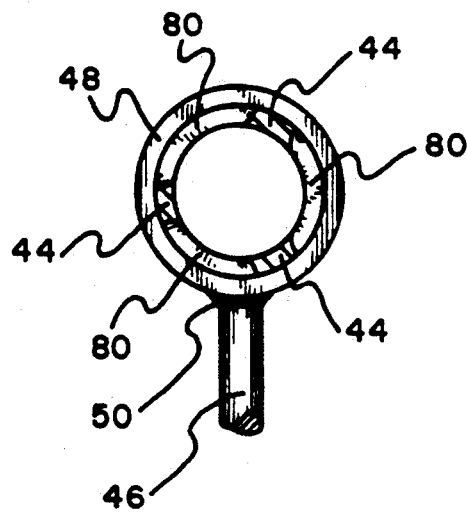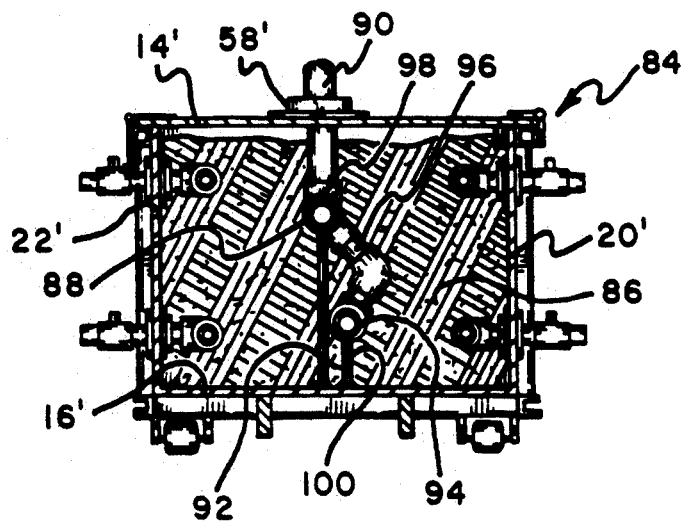

APPARATUS AND METHOD FOR ISOLATED REMEDIATION OF CONTAMINATED SOIL

BACKGROUND OF INVENTION

This invention relates to an apparatus and method for ex situ vacuum extraction of soils contaminated with volatile and semi-volatile chemical compounds.

There are a large number of sites in the United States and around the world at which soils have been contaminated with volatile and semi-volatile chemical compounds. These contaminants pose significant environmental and human health risks via various routes of exposure, including direct contact, infiltration to soil and ground water, surface water, and air emissions.

These contaminated soils may either be still in the ground where the contamination occurred or already removed and placed in stockpiles. Typically, the stockpiled materials remain at these sites for extended periods of time awaiting proper management, often out of compliance with local, state, and federal regulations. These stockpiles are generally uncontrolled and exposed to the environment, presenting a potential source of contamination via the migration pathways described above. Transportation and disposal of these contaminated soils is very expensive. Under present environmental regulations, depending upon the method of disposal, the original owner may be liable for the soil until it is pronounced environmentally safe. This is known as "cradle to grave" responsibility. The primary method of disposal continues to be placing the contaminated soils in secure landfills. These landfills are filling up at alarming rates. Many landfills are no longer accepting the large quantities of contaminated soil.

Various remediation methods have been developed to address the problem. These methods include incineration of the contaminated soil which is not acceptable in many states, in situ bioremediation, in situ air stripping, in situ flushing and soil washing, vitrification, and solidification/stabilization. Those methods that do not treat the soil but merely relocate them or contain them are becoming less popular.

Vacuum extraction and bioremediation have been used for many years to remediate contaminated soil and ground water. Most of these methods have been in situ, that is leaving the contaminated soil in place and treating the soil with various devices and methods. Ex situ methods such as farming and soil cells can be very costly, specifically due to the transportation costs. These methods lend themselves only to large facilities and sites where the volumes are in excess of five thousands cubic yards. The expense involved is too great to make it financially feasible to use those methods of treatment for small sites, such as gasoline service stations. The apparatus and method described in U.S. Pat. No. 4,919,570 to Fredrick, C. Payne describes a portable on-site soil treatment system. The Payne system describes a system of twelve circular tanks into which the contaminated soil is placed. Conduit connects the tanks in a closed recirculation system with a pump and an activated carbon adsorption system. The entire system remains on flatbed trailers on-site during the treatment of the soil and requires a relatively large continuous area for side by side placement of the trailers and the various elements of the system. Such an area is typically not available on small sites. The Payne device and method requires a major labor expense associated with the setting up of the manifold piping and running it to a separate pumping station as well as the substantial labor cost of breaking down the system at the end of the operation. The soil unloading procedure of the Payne kettles requires a crane to lift the vessels from the trailers for dumping, thus injecting substantial expense, safety concerns, and a requirement of overhead clearance, which is not always available. Further, the Payne device is a substantial installation and would likely create substantial public concern and worry, well beyond the relatively minor environmental problem.

There is a tremendous need for a system and method that will practically and cost effectively decontaminate soils on small sites with volumes of contaminated soils less then one thousand cubic yards. None of the prior devices and methods satisfy these needs nor attain the objects described hereinbelow.

SUMMARY OF THE INVENTION

In the present invention, contaminated soils are placed in an above ground portable container as the soils are extracted from the ground. The soils remain isolated from the environment and are decontaminated in the container. Chemical spills, whether an emergency response, such as when the occurrence is an overfill, or planned remediation such as replacement of underground storage tanks, both call for excavation of soils which have come in contact with contaminants. Often the volume of contaminated soil resulting from such events is relatively small, from ten cubic yards to several hundred cubic yards. The present invention is an apparatus and method to allow quick isolation of the contaminated material from the environment and quickly implementing an effective remedial action.

It is an object of the present invention to effectively remediate soils of varying permeability, contaminant types, and contaminant concentrations.

It is a further object to provide a method which can be performed on small sites, such as gasoline service stations, with a limited area and relatively small volumes of contaminated soil.

It is a particular object of this invention to provide remediation resulting in soil quality well below the applicable regulatory levels, which can then be reused as fill on the site of the original contamination or at an off site location.

It is an additional object of the present invention to provide a device and method that completely isolates the contaminated soils so that it is virtually impossible to allow any liquid to escape from the contaminated soil during treatment.

It is a further object of the present invention to provide a portable system that is easy to install and economical to use. In particular, it is an object to provide an apparatus that does not require vehicles or trailers to remain on site and does not require a single continuous area. It is a specific object to provide separate integral units which can be separated and placed at convenient locations on the site.

It is an additional object of the present invention to provide a device that can be easily unloaded with minimal set-up costs and breakdown cost. It is specifically an object of this invention to provide a unit including a container that may be transported by a standard container carrying vehicle that carries standard "roll-off" containers.

It is a particular object of the present invention to provide an unobtrusive device that looks like a standard roll-off container that will not alarm observers of the site that contaminants are being handled. It is particular object of the present invention to provide a sealed integral unit that allows tight control of the soils being treated with more uniform contact of nutrients, moisture and air flow to and through the contaminated soil.

It is an object of the present invention to provide a device and method that once the soil is decontaminated, it may be placed back into its original location or freely transported to another location as fill material. The carrier would simply roll the container filled with the clean soil onto its berth and dump it on site or transport it to another location. If the needs are greater, more than one container can be placed on site. Each container operates independently so that they may be placed at various locations around the site as room permits.

An aspect of the invention is an apparatus for treating earth containing volatile and semi-volatile contaminants. The apparatus is an integral unit. The apparatus includes a container that further includes a sealed chamber that has an interior surface, a bottom wall, a top wall, a first side wall, two adjacent side walls adjacent to the first side wall, an end wall opposite the first side wall, and a vertical plane through a central axis aligned normal to the first side wall. The apparatus further includes first means to allow opening of the first side wall to fully expose the chamber and close the first side wall to seal the chamber, and second means to allow opening the top wall to expose a sufficient opening to the chamber to allow charging the contaminated earth to the chamber, close the top wall, and seal the chamber. The apparatus also includes a plurality of lengths of first perforated tubing positioned and held in the chamber proximate to the interior surface of the chamber, first conduit connecting in flow communication to the first perforated tubing through openings in the chamber to the atmosphere, and valve means to control flow through the first conduit. The apparatus further includes at least one length of second perforated tubing aligned normal to the first side wall proximate to the vertical plane in the chamber and means to hold the second perforated tubing in position. The apparatus also includes vacuum means to draw a vacuum, pull vapors from the second perforated tubing, and dispense the vapors through a vent. The apparatus further includes second conduit connecting through an opening in the chamber to the second perforated tubing in flow communication to the vacuum means.

It is preferred that the first means includes vertical hinges hingeably connecting a vertical side edge of the first side wall to an opposing vertical side edge of one of the adjacent side walls. It is further preferred that the second means includes horizontal hinges hingeably connecting a side edge of the top wall to an opposing horizontal top edge of one of the adjacent side walls to fully open the top wall of the container. It is also preferred that the apparatus includes four lengths of first perforated tubing each length positioned and held in the chamber proximate one of four horizontal inside corners between the top wall and the adjacent side walls and between the bottom wall and the adjacent side walls, all the lengths of first perforated tubing being aligned normal to first side wall. It is further preferred that the openings for the first conduit connecting in flow communication to the first perforated tubing to the atmosphere are through both adjacent side walls. It is also preferred that both ends of the first perforated tubing be connected to the first conduit connecting in flow communication to the first perforated tubing to the atmosphere through both adjacent side walls. It is more preferred that both ends of the first perforated tubing be connected to the first conduit in flow communication. It is most preferred that each length of first perforated tubing including plug means medially positioned along the length of the tubing to divide and separate each tubing into two sections, each section being solely connected to the first conduit to flow communication. It is also preferred that there be only one length of second perforated tubing aligned proximately along the central axis in the chamber. It is further preferred that there be two lengths of second perforated tubing each length being positioned in vertical alignment one proximately above the other. It is also preferred that the means to hold the second perforated tubing in position incudes support members in a vertically aligned plane attached at first ends to the bottom wall and at second ends to collars encircling the second perforated tubing. It is also preferred that the opening for the second conduit connecting in flow communication to the second perforated tubing and the vacuum means to the vent be through the top wall.

Another aspect of the invention is a method for treating earth containing volatile and semi-volatile contaminants. The method includes providing an integral unit as described hereinabove. The method further includes opening the second means to open the top wall to fully expose the chamber and charging the chamber with the contaminated earth. The method further includes closing the second means to close the top wall to seal the chamber and drawing a vacuum and pulling vapors from the second perforated tubing with the vacuum means until a chosen quantity of contaminants have been removed. The method also includes opening the first means to open the first side wall to fully expose the chamber and tilting the container to cause the earth to flow out of the container through the open side wall. The method further includes closing the first means to close the first side wall and seal the chamber for the next use.

BRIEF DESCRIPTION OF DRAWINGS

FIG. 5 is a cross-sectional view taken along lines 5—5 of FIG. 1.

FIG. 5a is a schematic view similar to FIG. 5 of a second embodiment also showing soil that is placed in the first embodiment of FIGS. 1-5.

FIG. 6 is a partial cross-sectional view taken along lines 6—6 of FIG. 3.

DESCRIPTION OF PREFERRED EMBODIMENTS

The preferred structure is that of a standard roll-off container in common sizes of ten to forty cubic yards capacity. The inside chamber of these units typically varies in height from about three to seven feet, the length from about twelve to twenty-three feet, and the width at about seven feet. The container is modified with a venting system drawing atmospheric air through soil in the chamber. The contaminated soil is placed directly into the container which has been delivered and left at the site. The container is sealed isolating the contaminated material and effectively eliminating potential routes of exposure to the environment. The device and system can be modified to implement biodegradation processes to assist or complete the remediation of the contaminated material. In addition to providing a means of removing volatile contaminants, the air flow provides oxygen creating an aerobic environment which is necessary for the prosperity of naturally occurring bacteria which biodegrade the organic contaminants. During the placement of the soils into the container or even after the container has been sealed, nutrients may be added, such as nitrogen, phosphorous, potassium and the like. Moisture levels may be adjusted to proportions which will maximize bioremediation. It is an easy task to monitor the remediation process in this closed system. Soil and vapor samples can be collected from the various access ports of the container for field testing and laboratory analysis. Additional monitor ports or probes can be included to reach into the soil mass. Results of these tests can be used to monitor soil conditions and confirm the effective remediation of the material. During venting, the off gases can be monitored for hydrocarbons, oxygen, and carbon dioxide concentrations. Hot spots within the container can be located by these probes and can receive increased attention by increasing the airflow to that portion of that soil mass. This can be achieved by adjusting the valves to the intake conduit to increase the airflow through the hotspot in the soil mass. Thus, the valves regulating the airflow may be used to isolate the airflow to a chosen quadrant of the container.

Figure 1:
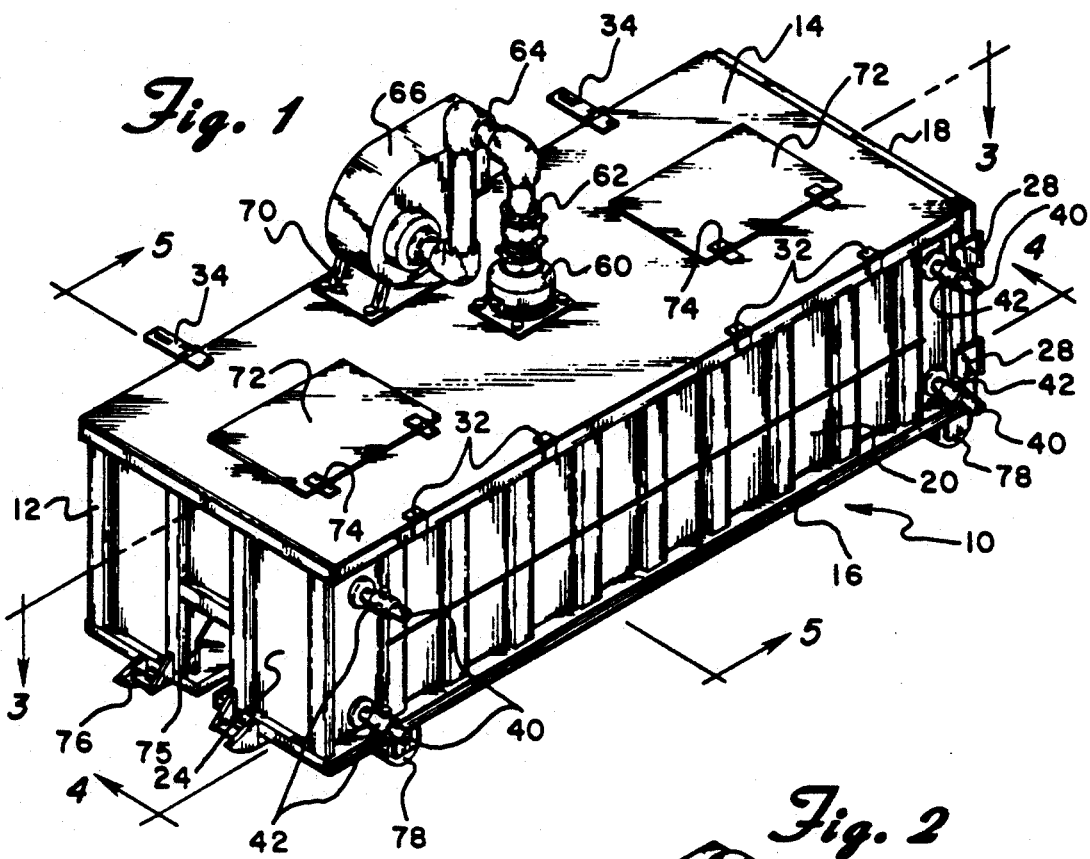
FIG. 1 is a perspective view of an apparatus under the present invention.
Figure 3:
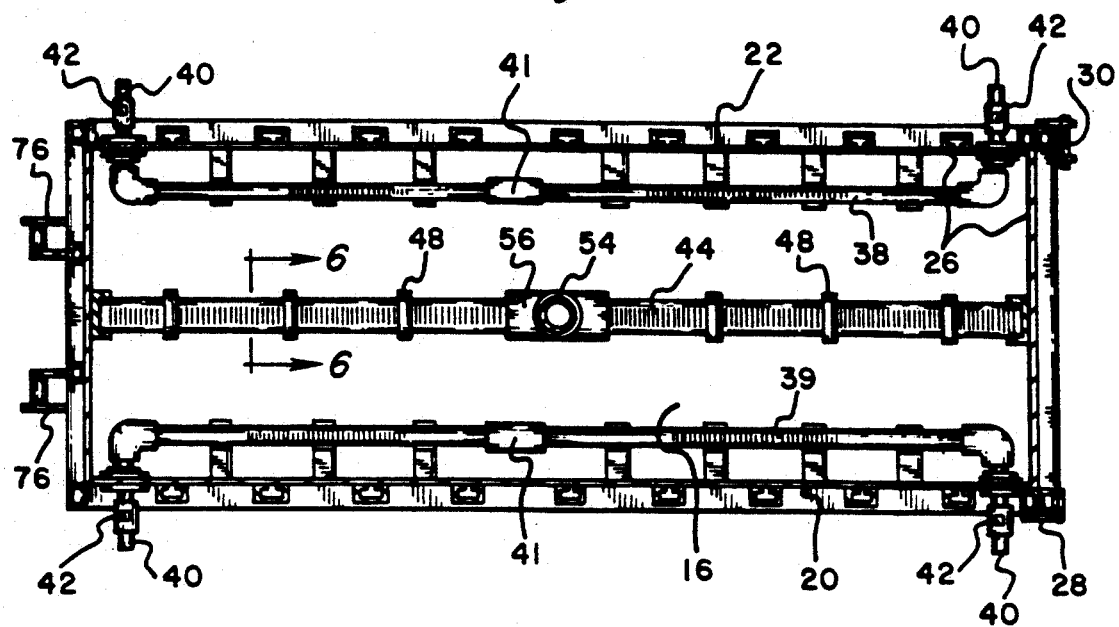
FIG. 3 is a horizontal partial cross-sectional view taken along lines 3—3 of FIG. 1.
Figure 4:
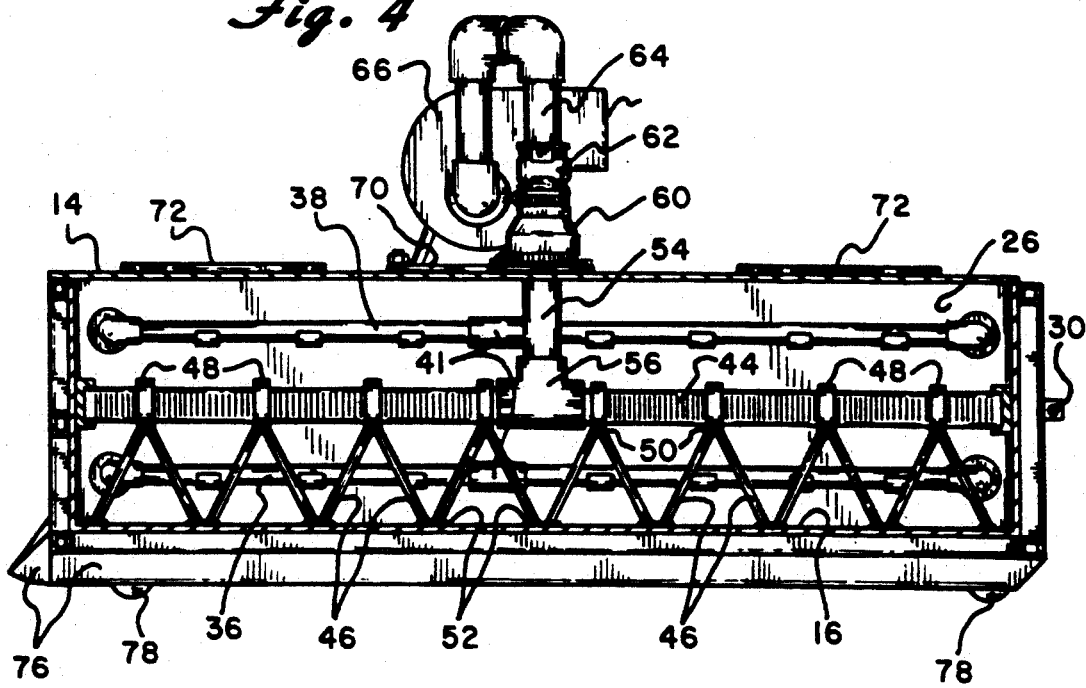
FIG. 4 is a vertical cross-sectional view taken along lines 4—4 of FIG. 1.

Apparatus 10 for isolated remediation of contaminated soil is illustrated in FIG. 1. Apparatus 10 includes container 12 which in many respects resembles and is constructed similarly to that of a standard roll-off trash container. The container is constructed of steel plates welded together with various side wall reinforcement members welded into an integral unit. Container 12 includes top wall 14 which hingeably opens, bottom wall 16 and first side wall 18 which is mostly hidden in the view of FIG. 1. Lengthwise vertical side walls 20 and 22 are adjacent to first side wall 18. Rear vertical side wall 24 is opposite side wall 18 and includes, standard interlocking hook and plate mechanism 75 to facilitate container 12 being dragged, carried, deposited and returned to a standard lift truck for transportation to and from the site of contamination. As also shown in FIGS. 3 and 4, container 12 includes interior surface 26 which includes the interior surfaces of all the walls of container 12. Vertical hinges 28 hingeably attach first side wall 18 to side wall 20 allowing first side wall 18 to swing open and essentially completely expose the interior of container 12. The lift truck using mechanism 75 lifts the opposite end of container 12 at rear side wall 24 to tilt container 12 and allow flow of the clean soil out of the container when the method and process of contamination removal has been completed. Latch closure 30 keeps first side wall 18 in a closed position and may be equipped with a suitable security locking mechanism. Horizontal hinges 32 hingeably attached top wall 14 to the upper edge of side wall 20 allowing the top wall to be rotated upwardly and off to the side to allow charging of the contaminated soil to container 12. Latch closures 34 secure top wall 14 to side wall 22 to effectively sealably close container 12 during the treatment of the contaminated soil. Although not illustrated, an elastic sealing gasket may be included between top wall 14 and the upper edges of the side walls. Again, suitable security locking devices may be provided to secure the top wall during the treatment procedures. Although a hinged connection is shown to entirely open top wall 14 off the container, a frame around the periphery to partially close off a portion of the container is satisfactory. Further the top wall may slide off the top of the container rather than the hinged attachment shown. It is important that the top open up a sufficient portion of the cavity to readily allow the contaminated soil to be charged with minimal spreading of the soil necessary to level the soil below the top edge of the container. As further shown in FIG. 5, first perforated PVC tubing is positioned and held proximate to the interior surfaces of side walls 20 and 22. These first lengths of perforated tubing, 36 through 39, provide air intake and distribution of the air throughout the body of soil mass being treated in container 12. Each length of first tubing is separated into two sections by sleeve plug 41 positioned close to the midpoint along the length of each first tubing. During treatment, the contaminated soil essentially fills the interior of container 12 as illustrated in FIG. 5a that also illustrates an alternative embodiment. Slotted perforated polyvinyl chloride tubing 36 and 38 are positioned lengthwise proximate to the interior surface of side wall 22. Perforated tubing 37 and 39 are positioned proximate to the interior surface of side wall 20. Tubings 38 and 39 are positioned close to the top of the side walls and tubing 36 and 37 are positioned close to the bottom of their respective side walls. By positioning these first lengths of tubing, along the lengthwise interior concerns of container 12, input air flow is essentially always flowing in a radial direction away from the interior surface of container 12 and toward a central vacuum collection of the air and any entrained contaminants. Each end of first tubing lengths 36, 37, 38, and 39 which are proximate side walls 18 and 24 are connected to conduits 40 which extend through the respective side walls 20 and 22 to the atmosphere. The first tubing is all slot perforated end to end although for clarification purposes slot marking are only illustrated on sections of the tubing in FIGS. 3 and 4. Each of these conduits 40 are controlled by valves 42 which may be adjusted to full open, full closed or any degree of opening desired to obtain optimum results of airflow through the soil mass. Second perforated tubing 44 is positioned and held in an alignment of a lengthwise center line normal to first side wall 18. It is preferred that the second perforated tubing be on a vertical plane which bisects lengthwise the interior volume of container 12 and is normal to first side wall 18.

Figure 2:
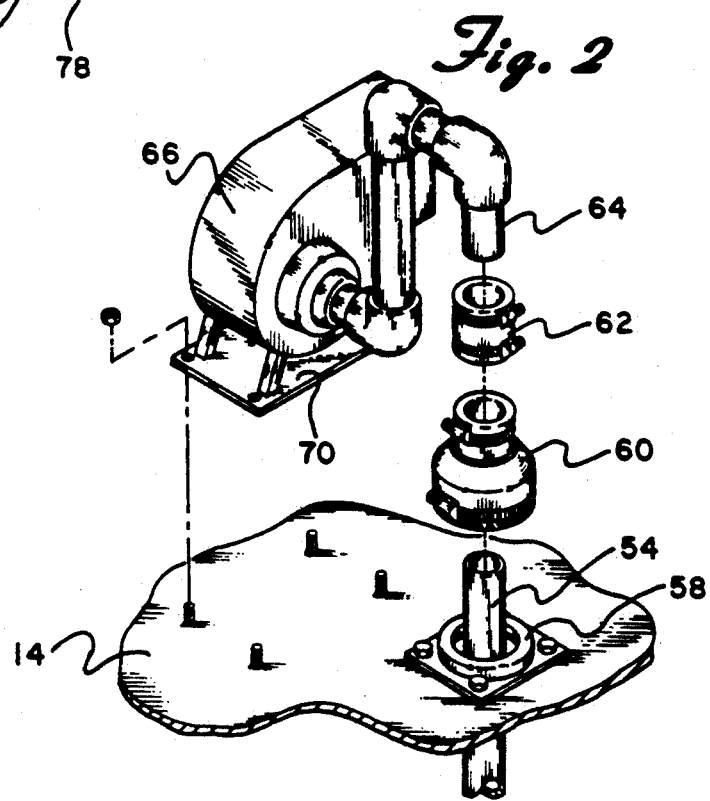
FIG. 2 is a partial expanded exploded perspective view of the outlet air device connections illustrated in FIG. 1.

Suitable perforated tubular screen is of polymeric plastic tubing such as PVC, ABS, glass fiber reinforced thermoset plastic or TEFLON. Satisfactory screen is TRILOC ® slotted PVC tubing marketed by Brainard-Kilman, with offices at 2175 West Park Court, P.O. Box 1959, Stone Mountain, Ga. The finer slot width is preferred, such as 0.010 and 0.020 inch, the chosen size selected based on soil particle size. The material type selected is based on consideration of strength, cost, and reactivity with certain contaminants. PVC is utilized for most applications. PVC is readily commercially available, durable, easy to use, and relatively inexpensive. As an alternative, commercially available "Johnson Well Screens" in the form of stainless steel and PVC spiral tube with a spiral slot supplied by Johnson Div. UOP, Inc, with offices at 1950 Old Highway No. 8, New Brighton, Minn., are suitable substitutes. Second perforated tubing 44 is securely held in position as shown in FIGS. 3, 4, 5 and 6 by circular collars 48 which are connected to vertically positioned angled support rods 46 at upper ends 50. Support rods 46 are welded at lower ends 52 to the interior surface of bottom wall 16. Tubing 44 is sealably capped at both ends and is slotted end to end to provide a screen filter opening centrally at "T" connector 56 to vertical conduit tube 54 extending upwardly and through an opening in top wall 14. As more clearly shown in the exploded view of FIG. 2, vertical conduit tube 54 extends upwardly through an opening through top wall 14 which is encircled by vertical collar 58 attached to the top surface of wall 14. Standard rubber elastomeric reducer boot connector 60 attaches at the lower end over and around collar 58 and may remain attached to that collar. Tubing 54 extends through rubber reducer connector 60 and connects through rubber tube connector 62 to conduit 64. The upper end of connector 60 is sealably connected to vertical conduit 54. Conduit 64 connects to vacuum blower 66 capable of drawing about four to twenty inches of mercury vacuum on tubing 54 and on the interior of the container with air flow ranging from about five to two hundred fifty CFM. The blower capacity and type will depend upon soil permeability, level of contamination, nature of contamination, and local regulatory requirements for emissions. Air handler 66 is bolted through plate 70 to the top surface of wall 14. Air handler 66 vents directly to the atmosphere through opening 68. Trap doors 72 are hingeably attached through hinges 74 to top wall 14 allowing ready access for testing purposes to the interior of the container and, although not shown, are securely fastened to the top wall. Mechanism 75 opens into side wall 24, being a standard mechanism to allow connection to cables to a roll-off hoist to drag the entire container onto a lift truck, such as those commercially available products offered by Rudco Products Inc. with offices at 114 East Oak Road of Vineland, N.J. With these standard mechanisms, the container can be lifted to a dump angle of 52 degrees which is sufficient to allow ready removal of the clean soil after the method of the present invention has been completed. For moving and lifting purposes, standard skids 76 and wheels 78 are provided at the bottom of the container. In FIG. 6 an enlarged view of second tubing 44 is provided although these views of the tubing may also be considered appropriate views of the first tubing lengths 36 through 39. Slots essentially identical to slots 80 and 82 as shown in FIG. 6 are along the entire lengths of the first tubing. Slots 80, only a few mils in width, provide an effective screen with substantial air flow both into and out of the container of the present invention. In FIG. 5a, a second embodiment is illustrated with soil 86 filling the inside of the container which is identical of container 12. In this embodiment, two perforated second lengths of tubing are provided. Upper perforated tubing 88 is positioned and connected through "T" connection 98 to vertical conduit 90 opening and connected to a blower identical to that of blower 66. In this embodiment, second perforated tube 94 is positioned below and aligned parallel with that of tube 88. Lower tube 94 is connected through connecting conduit 96 through tube 88 to conduit 90 so that a vacuum can be drawn at two levels within the soil mass. Although the drawing shows the tubing slightly off center of a vertical plane through the lengthwise center line, for clarification purposes, tubing 88 and 94 are both positioned proximate to the vertical plane running centrally lengthwise through the container. Upper perforated tube is supported by rod framework 92 while lower perforated tubing 94 is supported by rod framework 100.

The slotted first tubing providing the influx of air and the slotted second tubing providing removal of the vapors after the air has passed through the soil, both run longitudinally through the length of the container. This preferred alignment is with the direction that the soil will take when it is dumped out of the first side of the container. In this fashion, the least amount of resistance will be encountered by the moving soil. It is further preferred that the inlet slotted tubing, which is located proximate to the interior surface of the container be connected to inlet conduit extending and opening through either or both of the container sides that are adjacent to the openable side of the container. Depending upon the local regulations it may be necessary to treat the emissions from the blower. A suitable standard state of the art treatment method and device may be utilized such as an activated carbon filter canister or catalytic converter.

While this invention has been described with reference to the specific embodiments disclosed herein, it is not confined to the details set forth and the patent is intended to include modifications and changes which may come within and extend from the following claims.

We claim:

1. An apparatus for treating earth containing volatile and semivolatile contaminants, the apparatus being an integral unit comprising:
   (a) a container comprising:
      (i) a sealed chamber comprising an interior surface, a bottom wall, a top wall, a first side wall, two adjacent side walls adjacent to the first side wall, an end wall opposite the first side wall, and a vertical plane through a central axis aligned normal to the first side wall,
      (ii) first means to allow opening the first side wall to fully expose the chamber and close the first side wall to seal the chamber, and
      (iii) second means to allow opening the top wall to expose a sufficient opening to the chamber to allow charging the contaminated earth to the chamber, close the top wall, and seal the chamber,
   (b) a plurality of lengths of first perforated tubing positioned and held in the chamber proximate the interior surface of the chamber,
   (c) first conduit connecting in flow communication to the first perforated tubing through openings in the chamber to the atmosphere,
   (d) valve means to control flow through the first conduit,
   (e) at least one length of second perforated tubing aligned normal to the first side wall proximately along the vertical plane in the chamber,
   (f) means to hold the second perforated tubing in position,
   (g) vacuum means to draw a vacuum, pull vapors from the second perforated tubing, and dispense the vapors through a vent, and
   (h) second conduit connecting through an opening in the chamber the second perforated tubing in flow communication to the vacuum means.

2. The apparatus of claim 1 wherein the first means comprises vertical hinges hingeably connecting a vertical side edge of the first side wall to an opposing vertical side edge of one of the adjacent side walls.

3. The apparatus of claim 1 wherein the second means comprises horizontal hinges hingeably connecting a side edge of the top wall to an opposing horizontal top edge of one of the adjacent side walls to fully open the top wall of the container.

4. The apparatus of claim 1 wherein the apparatus comprises four lengths of first perforated tubing each length positioned and held in the chamber proximate one of four horizontal inside corners between the top wall and the adjacent side walls and between the the bottom wall and the adjacent side walls, all the lengths of first perforated tubing being aligned normal to first side wall.

5. The apparatus of claim 1 wherein the openings for the first conduit connecting in flow communication to the first perforated tubing to the atmosphere are through both adjacent side walls.

6. The apparatus of claim 4 wherein the openings for the first conduit connecting in flow communication to the first perforated tubing to the atmosphere are through both adjacent side walls.

7. The apparatus of claim 4 wherein both ends of the first perforated tubing are connected to the first conduit connecting in flow communication to the atmosphere through both adjacent side walls.

8. The apparatus of claim 7 wherein each length of first perforated tubing comprises means medially positioned along the length of the tubing to plug and divide each tubing length into two sections, each section being solely connected to the first conduit in flow communication.

9. The apparatus of claim 1 comprising only one length of second perforated closed ended tubing aligned proximately along the central axis in the chamber.

10. The apparatus of claim 1 comprising two lengths of second perforated closed ended tubing each length positioned in vertical alignment one proximately above the other.

11. The apparatus of claim 1 wherein the means to hold the second perforated tubing in position comprises support members in a vertically aligned plane attached at first ends to the bottom wall and at second ends to collars encircling the second perforated tubing.

12. The apparatus of claim 1 wherein the opening for the second conduit connecting in flow communication to the second perforated tubing and the vacuum means to the vent is through the top wall.

13. An apparatus for treating earth containing volatile and semivolatile contaminants, the apparatus being an integral unit comprising:
  (a) a container comprising:
    (i) a sealed chamber comprising an interior surface, a bottom wall, a top wall, a first side wall, two adjacent side walls adjacent to the first side wall, an end wall opposite the first side wall, and a vertical plane through a central axis aligned normal to the first side wall,
    (ii) first means to allow opening the first side wall to fully expose the chamber and close the first side wall to seal the chamber, the first means comprising vertical hinges hingeably connecting a vertical side edge of the first side wall to an opposing vertical side edge of one of the adjacent side walls, and
    (iii) second means to allow opening the top wall to expose a sufficient opening to the chamber to allow charging the contaminated earth to the chamber, close the top wall, and seal the chamber, the second means comprising horizontal hinges hingeably connecting a side edge of the top wall to an opposing horizontal top edge of one of the adjacent side walls to fully open the top wall of the container,
  (b) four lengths of first perforated tubing each length positioned and held in the chamber proximate one of four horizontal inside corners between the top wall and the adjacent side walls and between the the bottom wall and the adjacent side walls, all the lengths of first perforated tubing being aligned normal to first side wall,
  (c) first conduit connecting in flow communication to both ends of each first perforated tubing through openings through both adjacent side walls to the atmosphere,
  (d) valve means to control flow through the first conduit,
  (e) one length of second perforated tubing aligned proximately along the central axis in the chamber,
  (f) means to hold the second perforated tubing in position comprising support members in a vertically aligned plane attached at first ends to the bottom wall and at second ends to collars encircling the second perforated tubing,
  (g) vacuum means to draw a vacuum, pull vapors from the second perforated tubing, and dispense the vapors through a vent, and
  (h) second conduit connecting through an opening in the top wall the second perforated tubing in flow communication to the vacuum means.

14. A method for treating earth containing volatile and semivolatile contaminants, the method comprising:
  (a) providing an integral unit comprising
    (i) a sealed chamber comprising an interior surface, a bottom wall, a top wall, a first side wall, two adjacent side walls adjacent to the first side wall, an end wall opposite the first side wall, and a vertical plane through a central axis aligned normal to the first side wall,
    (ii) first means to allow opening the first side wall to fully expose the chamber and close the first side wall to seal the chamber, and
    (iii) second means to allow opening the top wall to expose a sufficient opening to the chamber to allow charging the contaminated earth to the chamber, close the top wall, and seal the chamber,
    (iv) a plurality of lengths of first perforated tubing positioned and held in the chamber proximate the interior surface of the chamber,
    (v) first conduit connecting in flow communication the first perforated tubing through openings in the chamber to the atmosphere,
    (vi) valve means to control flow through the first conduit,
    (vii) at least one length of second perforated tubing aligned normal to the first side wall proximate to the vertical plane in the chamber,
    (viii) means to hold the second perforated tubing in position,
    (ix) vacuum means to draw a vacuum and pull vapors from the second perforated tubing, and (x) second conduit connecting through an opening in the chamber the second perforated tubing in flow communication to the vacuum means.
(b) opening the second means to open the top wall to fully expose the chamber,
(c) charging the chamber with the contaminated earth,
(d) closing the second means to close the top wall to seal the chamber,
(e) drawing a vacuum and pulling vapors from the second perforated tubing with the vacuum means until a chosen quantity of contaminants have been removed,
(f) opening the first means to open the first side wall to fully expose the chamber,
(g) tilting the container to cause the earth to flow out of the container through the open side wall, and
(h) closing the first means to close the first side wall and seal the chamber.

* * * * *